United States Patent
Cao et al.

(10) Patent No.: US 8,827,053 B2
(45) Date of Patent: Sep. 9, 2014

(54) SELF-AMPLIFYING ELECTROMECHANICAL PARTIAL LINING DISC BRAKE

(75) Inventors: Chi-Thuan Cao, Korntal-Muenchingen (DE); Dietmar Baumann, Hemmingen (DE); Dirk Hofmann, Stuttgart (DE); Herbert Vollert, Vaihingen/Enz (DE); Willi Nagel, Remseck/Hochdorf (DE); Andreas Henke, Diemelstadt (DE); Bertram Foitzik, Ilsfeld (DE); Bernd Goetzelmann, Sindelfingen (DE); Hans Frick, Wiggensbach (DE)

(73) Assignee: Robert Bosch GmbH, Stuttgart (DE)

( * ) Notice: Subject to any disclaimer, the term of this patent is extended or adjusted under 35 U.S.C. 154(b) by 1357 days.

(21) Appl. No.: 12/096,080

(22) PCT Filed: Mar. 19, 2007

(86) PCT No.: PCT/EP2007/052559
§ 371 (c)(1),
(2), (4) Date: Jun. 4, 2008

(87) PCT Pub. No.: WO2007/115900
PCT Pub. Date: Oct. 18, 2007

(65) Prior Publication Data
US 2008/0296102 A1     Dec. 4, 2008

(30) Foreign Application Priority Data
Apr. 4, 2006 (DE) .......................... 10 2006 015 741

(51) Int. Cl.
| F16D 55/22 | (2006.01) |
| F16D 55/14 | (2006.01) |
| F16D 65/14 | (2006.01) |
| F16D 127/10 | (2012.01) |
| F16D 125/24 | (2012.01) |

(52) U.S. Cl.
CPC ............ *F16D 65/14* (2013.01); *F16D 2127/10* (2013.01); *F16D 2125/24* (2013.01)
USPC ........ 188/72.2; 188/708; 188/71.8; 188/72.1; 188/136; 188/157; 188/162

(58) Field of Classification Search
USPC ............ 188/72.1, 72.2, 72.7, 70 R, 70 B, 158
IPC ....................... F16D 55/22,65/21, 65/092, 55/46
See application file for complete search history.

(56) References Cited

U.S. PATENT DOCUMENTS

| 6,318,513 | B1 * | 11/2001 | Dietrich et al. | 188/72.7 |
| 7,588,128 | B2 * | 9/2009 | Baumann et al. | 188/72.7 |
| 7,735,613 | B2 * | 6/2010 | Baumann et al. | 188/72.7 |
| 2004/0011603 | A1 * | 1/2004 | Yokoyama et al. | 188/72.7 |
| 2004/0134723 | A1 * | 7/2004 | Baumann et al. | 188/72.2 |
| 2005/0161295 | A1 * | 7/2005 | Nilsson et al. | 188/158 |
| 2005/0168066 | A1 * | 8/2005 | Svendenius et al. | 303/150 |

FOREIGN PATENT DOCUMENTS

| DE | 103 61 264 A1 | 7/2005 |
| WO | WO 03/056204 A1 | 7/2003 |
| WO | WO 2007/017333 A1 | 2/2007 |

* cited by examiner

Primary Examiner — Anna Momper
Assistant Examiner — San Aung
(74) Attorney, Agent, or Firm — Maginot, Moore & Beck

(57) ABSTRACT

The present invention relates to a self-amplifying electromechanical partial lining disc brake, having a ramp mechanism as a self-amplification device. According to the invention, a rack for driving a friction brake pad is situated between roller elements of the ramp mechanism, particularly at a geometrical centroid of an imaginary surface defined by the roller elements. As a result a load is distributed to the roller elements in a more uniform fashion and the pressing force of the friction brake pad against a brake disc when the partial lining disc brake is actuated is distributed more uniformly and counteracts irregular pad wear.

14 Claims, 2 Drawing Sheets

SELF-AMPLIFYING ELECTROMECHANICAL PARTIAL LINING DISC BRAKE

CROSS-REFERENCE TO RELATED APPLICATION

This application is a 35 USC 371 application of PCT/EP 2007/052559 filed on Mar. 19, 2007.

BACKGROUND OF THE INVENTION

1. Field of the Invention

The invention relates to a self-amplifying electromechanical partial lining disc brake. The term "partial lining" means that the disc brake, in particular its friction brake pad, extends over a fraction of a circumference of a brake disc. Usually, the partial lining disc brake, its brake caliper, and the friction brake pad or pads are situated at a location on a circumference of the brake disc and extend over only a short distance of its circumference in the circumferential direction.

2. Description of the Prior Art

US Publication No. 20070137949A1 has disclosed a self-amplifying electromechanical partial lining disc brake of this kind. The known partial lining disc brake has a movable friction brake pad that an electromechanical actuating device can press against a brake disc in order to actuate the partial lining disc brake. The electromechanical actuating device has an electric motor, a mechanical reduction gear, and a rack-and-pinion transmission for converting the rotating motion of the electric motor and reduction gear into a translating motion for moving the friction brake pad. There are also other conceivable and possible embodiments of the electromechanical actuating device; for example, the rotating motion can be converted into a translating motion by means of a screw drive or a cam.

The known partial lining disc brake has a self-amplification device with a ramp mechanism. The ramp mechanism has three ramps that support the friction brake pad at three points that do not lie on a straight line. The support can be thought of as a three-point support at the corners of an imaginary triangle. The support is statically determined. The ramps extend in a circumference direction and at a ramp angle to the brake disc. In lieu of extending in the circumference direction, the ramps can also extend, for example, in the direction of a chord in relation to the brake disc. The essential thing is for there to be a path of the ramps and a movement of the friction brake pad such that a friction force, which the rotating brake disc exerts on the friction brake pad which is pressed against the brake disc during braking, acts on the friction brake pad in the direction of a narrowing wedge gap between the ramps and the brake disc in order to produce the self-amplification described below. The ramp mechanism movably guides the friction brake pad in the circumferential direction in relation to the brake disc and at the ramp angle in relation to the brake disc. The electromechanical actuating device produces the movement of the friction brake pad for the actuation of the partial lining disc brake. The ramp angle can change in the course of the ramps. For example, a large ramp angle at the beginning of the movement of the friction brake pad makes it possible to quickly overcome an air gap, i.e. a gap between the friction brake pad and the brake disc, at the beginning of the actuation of the partial lining disc brake, in order to quickly bring the friction brake pad into contact with the brake disc. A ramp angle that becomes increasingly smaller with the movement of the friction brake pad achieves a more powerful self-amplification as the braking force increases. If the ramp angle is constant over the course of the ramps, this is also referred to as a wedge mechanism. The movement of the friction brake pad is a helical movement in the circumference direction of the brake disc, with a changing or constant slope in relation to the brake disc.

When the partial lining brake disc is actuated, the rotating brake disc exerts a friction force on the friction brake pad that is pressed against it. The friction force acts on the friction brake pad in the direction of a narrowing wedge gap between the ramps and the brake disc. Because of the ramp angle and due to the so-called wedge principle, the support of the friction brake pad against the ramps produces a supporting force that has a force component perpendicular to the brake disc. This force component produces a pressing force that presses the friction brake pad against the brake disc. This pressing force results from the friction force; it is not exerted by the actuating device, but presses the friction brake pad against the brake disc in addition to a pressing force exerted by the actuating device. This amplifies the braking force; the partial lining disc brake has a self-amplification; and the ramp mechanism constitutes a self-amplification device that converts the friction force, which the brake disc exerts on the friction brake pad that is pressed against it, into a pressing force.

The ramp mechanism of the known partial lining disc brake has a roller elements that roll along the ramps and support the friction brake pad. The roller elements of the known partial lining disc brake are rollers, for example cylindrical rollers or conical rollers. It is also possible to use balls as the roller elements. The ramps can be raised and/or recessed, for example in the form of grooves or flutes whose depth changes in one direction over the span of their length. The roller elements are situated at the corners of an imaginary triangle.

SUMMARY AND ADVANTAGES OF THE INVENTION

In the self-amplifying electromechanical partial lining disc brake according to the invention, an imaginary line of action of an actuating force, which the actuating device exerts on the friction brake pad at an angle to the brake disc, passes through between the roller elements. The line of action of the actuating force thus intersects the imaginary triangle defined by the roller elements of the ramp mechanism. Preferably, the intersecting point of the line of action and the imaginary triangle is situated in the geometrical centroid of the triangle. The load due to the actuating force that the actuating device exerts on the friction brake pad is therefore distributed more uniformly to the rolling elements. The pressing force of the friction brake pad against the brake disc is distributed more uniformly over the surface of the friction brake pad, thus resulting in a more uniform wear over the surface of the friction brake pad. Another advantage of the present invention is that it reduces a torque on the friction brake pad generated by the actuating force. The actuating force generates such a torque when its line of action strikes the friction brake pad radially inside or radially outside the geometrical centroid of the friction brake pad. The present invention reduces the radial distance between the centroid and the point at which the actuating force strikes the friction brake pad. Ideally, this distance becomes zero. Likewise, the torque is reduced to zero in the ideal case. The torque acts around an axis perpendicular to the brake disc, extending through the geometrical centroid of the friction brake pad.

BRIEF DESCRIPTION OF THE DRAWINGS

The invention will be explained in greater detail below in conjunction with an exemplary embodiment shown in the drawings, in which.

DESCRIPTION OF THE PREFERRED EMBODIMENT

Figure 1:
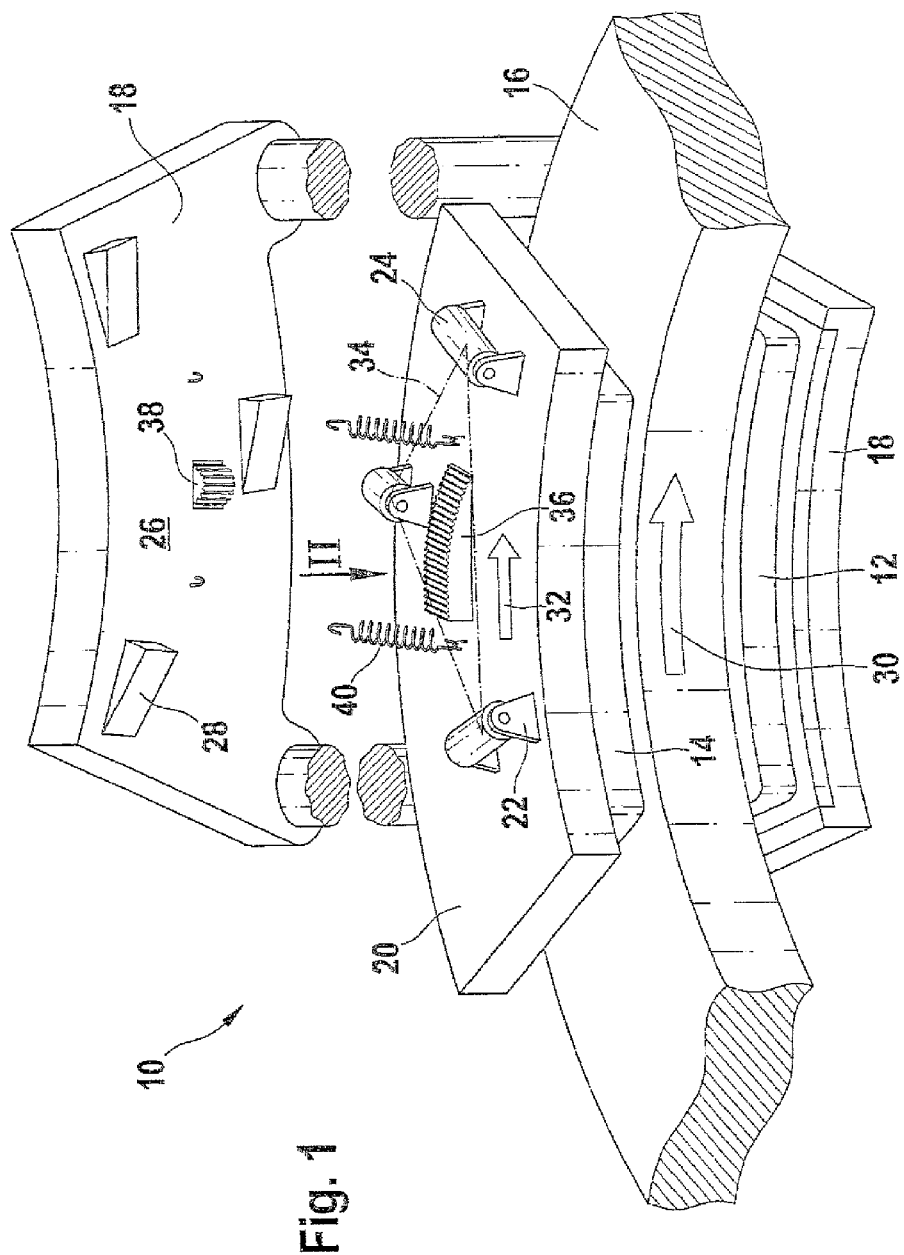
FIG. 1 is a schematic, perspective depiction of a self-amplifying electromechanical partial lining disc brake according to the present invention.
Figure 2:
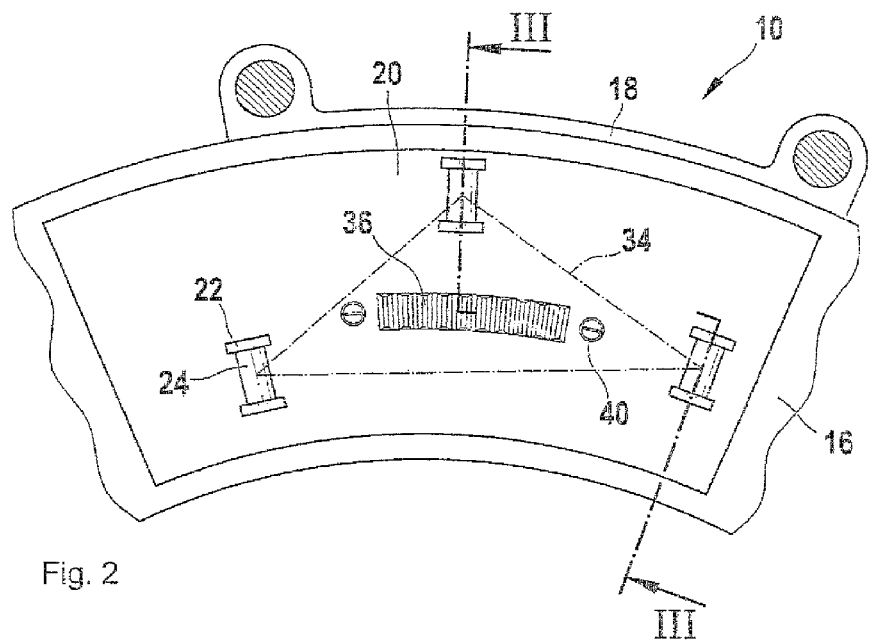
FIG. 2 is a view of a rear side of a friction brake pad of the partial lining disc brae according to arrow II in FIG. 1.

FIG. 1 schematically depicts a self-amplifying electromechanical partial lining disc brake 10 according to the present invention. The partial lining disc brake 10 has two friction brake pads 12, 14 that are situated on both sides of a brake disc 16. One of the two friction brake pads 12 is stationary, i.e. does not move in a brake caliper 18. This friction brake pad 12 is referred to below as the fixed friction brake pad 12. The drawing shows a part of the brake caliper 18 situated above the brake disc 16 broken away and folded up and out by 90° because otherwise, it would cover essential parts of the partial lining disc brake 10. The brake caliper 18 embraces the brake disc 16 in the usual way, outside of its circumference.

The other friction brake pad 14 is movable in a rotation direction and perpendicular to the brake disc 16. The expression "in the rotation direction of the brake disc 16" means that the movable friction brake pad 14 is able to rotate around an imaginary axis that at least approximately coincides with a rotation axis of the brake disc 16. Basically, it is also possible for the movable friction brake pad 14 to be able to move in a secant direction in relation to the brake disc 16. The movement of the friction brake pad 14 in order to actuate the partial lining disc brake 10 is produced by means of an electromechanical actuating device that is not shown for the sake of better visibility. Actuating devices of this kind are known to those skilled in the art in various designs from the prior art and, since they are not the actual subject of the present invention, do not need to be explained in detail here.

As is usually the case, the friction brake pad 14 is attached to a brake pad support plate 20 in a fixed, nondetachable way. On a rear side oriented away from the brake disc 16, the brake pad support plate 20 has bearing blocks 22 in which roller elements 24 are supported in rotary fashion. In the exemplary embodiment of the invention depicted and described here, rollers are used as the roller elements 24. Rotation axes of the roller elements 24 extend radial to a rotation axis of the brake disc 16. It is not, however, absolutely necessary for the rotation axes of the roller elements 24 to be aligned radially in relation to the rotation axis of the brake disc 16. If the friction brake pad 14 is moved, for example, in a chord direction in relation to the brake disc 16, then the rotation axes of the roller elements 24 travel parallel to one another and at right angles to the chord. The bearing blocks 26 support the roller elements 24 at fixed positions and in a rotary fashion on the movable friction brake pad 14; when the friction brake pad 14 moves, the roller elements 24 move along with the friction brake pad 14.

A front side of a thrust plate 26 oriented toward the brake disc 16 has ramps 28 situated on it, against which the roller elements 24 are supported and along which the roller elements 24 roll. The ramps 28 extend in a circumference and rotation direction of the brake disc 16 and therefore in the movement direction of the friction brake pad 14. The ramps 28 rise in the rotation direction of the brake disc 16. In the exemplary embodiment shown, the thrust plate 26 is the part of the brake caliper 18 that is broken away and folded up and out in the depiction.

The thrust plate 26 is situated approximately congruent to the brake pad support plate 20 on its rear side oriented away from the brake disc 16. In FIG. 1 as explained above, the thrust plate 26 is shown folded up and out in order to reveal the ramps 28 and the roller elements 24. In reality, the thrust plate 26 is parallel to the friction brake pads 12, 14, the brake disc 16, and the brake pad support plate 20. The brake caliper 18 is embodied in the form of a so-called floating caliper, i.e. it is able to move perpendicular to the brake disc 16. When the movable friction brake pad 14 is pressed against the brake disc 16, the brake caliper 18 is shifted perpendicular to the brake disc 16 and presses the fixed friction brake pad 12 against the other side of the brake disc 16 so that the brake disc 16 is braked by both of the friction brake pads 12, 14.

In order to actuate the partial lining disc brake 10, the movable friction brake pad 14 is moved in the rotation direction of the brake disc 16. The rotation direction of the brake disc 16 is indicated by the arrow 30 in FIG. 1 and the movement direction of the friction brake pad 14 is indicated by the arrow 32 on the brake pad support plate 20. When the friction brake pad 14 moves in the rotation direction 30 of the brake disc 16, the roller elements 24 roll along the ramps 28. Because of the slope of the ramps 28, during the movement of the friction brake pad 14 in the rotation direction 30 of the brake disc 16, it is moved toward the brake disc 16 and pressed against it. The brake disc 16 is braked. The rotating brake disc 16 exerts a friction force in the rotation direction 30 against the friction brake pad 14 that is pressed against it, acting on the friction brake pad 14 in the rotation direction 30 of the brake disc 16 and therefore in its movement direction 32. Because of the support on the ramps 28, the exertion of the friction force on the friction brake pad 14 in the rotation direction 30 of the brake disc 16 produces a supporting force perpendicular to the ramps 28, which has a component perpendicular to the brake disc 16. This force component perpendicular to the brake disc 16 produces a pressing force that presses the friction brake pad 14 against the brake disc 16 in addition to a pressing force exerted by the actuating device. This amplifies the braking force of the partial lining disc brake 10.

The ramps 28 extend at a usually acute ramp angle in relation to the brake disc 16. The ramp angle can change over the course of the ramps 28. i.e. in their longitudinal direction. When a ramp angle is constant over the length of the ramps 28, they are also referred to as wedges. The ramps 28 constitute a ramp mechanism that produces the self-amplification of the partial lining disc brake 10.

In the exemplary embodiment shown, three roller elements 24 are situated on the brake pad support plate 20 and three ramps 28 are situated on the thrust plate 26. This produces a statically determined support of the friction brake pad 14. It is also conceivable for there to be a statically over-determined support with more than three roller elements 24 and ramps 28. It is additionally possible for there to be fewer than three roller elements 24 and ramps 28, for example if two roller elements 24 and two ramps 28 extend beyond a width of the brake pad support plate 20 (not shown).

In the exemplary embodiment shown in FIG. 1, the ramps 28 rise in only one rotation direction 30 of the brake disc 16 and the partial lining disc brake 10 therefore has a self-amplification only in the rotation direction of the brake disc 16 indicated by the arrow 30. There is no self-amplification in the opposite rotation direction of the brake disc 16. In order to achieve a self-amplification for the opposite rotation direction of the brake disc 16 as well, it is possible to provide ramps that rise in the opposite direction (not shown). By means of different ramp angles, it is possible to achieve different selfamplifications in the two rotation directions of the brake disc 16, i.e. for driving forward and in reverse.

The three roller elements 24 define an imaginary triangle 34 indicated with dot-and-dash lines, whose corners are situated in the longitudinal centers of the roller elements 24. For actuation of the partial lining disc brake 10, the brake pad support plate 20 is equipped with a rack 36 on its rear side. Like the ramps 28, the rack 36 extends in the circumference direction in relation to the brake disc 16, at an angle to the brake disc 16 that corresponds to the ramp angle. The slope of the rack 36 is equal to the slopes of the ramps 28. The rack 36 is situated inside the imaginary triangle 34 defined by the roller elements 24. The rack 36 passes through the imaginary geometrical centroid of the triangle 34. The driving action is exerted by means of a pinion 38 that is visible in the thrust plate 26 in FIG. 1 and meshes with the rack 36. The pinion 38 is driven by an electric motor that is not show, by means of a mechanical reduction gear that is also not shown. The rack 36, the pinion 38 that meshes with it, the electric motor, and the reduction gear constitute an electromechanical actuating device of the partial lining disc brake 10.

The pinion 38 engages in the teeth of the rack 36. A line of action of an actuating force exerted by the actuating device consequently extends through the teeth of the rack 36 in its longitudinal direction. Due to the arrangement of the rack 36 in the centroid of the imaginary triangle 34 defined by the roller elements 24, the line of action of the actuating force passes through the triangle 34, preferably through its centroid. As a result, the actuating force is uniformly distributed to the roller elements 24. The pressing force of the friction brake pad 14 against the brake disc 16 is also uniformly distributed to the area of the friction brake pad 14, thus avoiding irregular wear on the pad.

The rack 36 is situated on an imaginary circular arc line around the rotation axis of brake disc 16; it is situated on an imaginary normal to the brake disc 16 extending through the geometrical centroid of the friction brake pad 14. In other words the rack 36 is situated on the effective friction radius of the friction brake pad 14. This prevents the actuating force from generating a torque on the friction brake pad 14 around an imaginary axis perpendicular to the brake disc 16.

The line of action of the actuating force extends in the movement direction of the friction brake pad 14 predetermined by the ramps 28. This achieves a maximum utilization of the actuating force exerted by the actuating device, i.e. the pressing force of the friction brake pad 14 against the brake disc 16, which is generated by the actuating force, is at a maximum for a given actuating force.

The partial lining disc brake 10 has two retaining springs 40. In the exemplary embodiment depicted and described here, these retaining springs are embodied in the form of helical tensions springs and are suspended on the rear side of the brake pad support plate 20 and the front side of the thrust plate 26. The arrangement of the retaining springs 40 causes the roller elements 24 to remain pressed against the ramps 28 whenever the partial lining disc brake 10 is released so that the friction brake pad 14 continues to be guided in a movable fashion in the circumference direction of the brake disc 16. The retaining springs 40 are situated inside the imaginary triangle 34 defined by the roller elements 24. Their imaginary common line of action preferably passes through the centroid of the triangle 34 and through the effective friction radius of the friction brake pad 14. The effective friction radius is the distance between the centroid of the friction brake pad 14 and the rotation axis of the brake disc 16. The expression "common line of action" of the retaining springs 40 refers to the line of action of an imaginary retaining spring that would replace the two retaining springs 40 and would exert the same action as they do on the brake pad support plate 20. The partial lining disc brake 10 can in any case theoretically also be provided with only one retaining spring or with more than two retaining springs (not shown).

Figure 3:
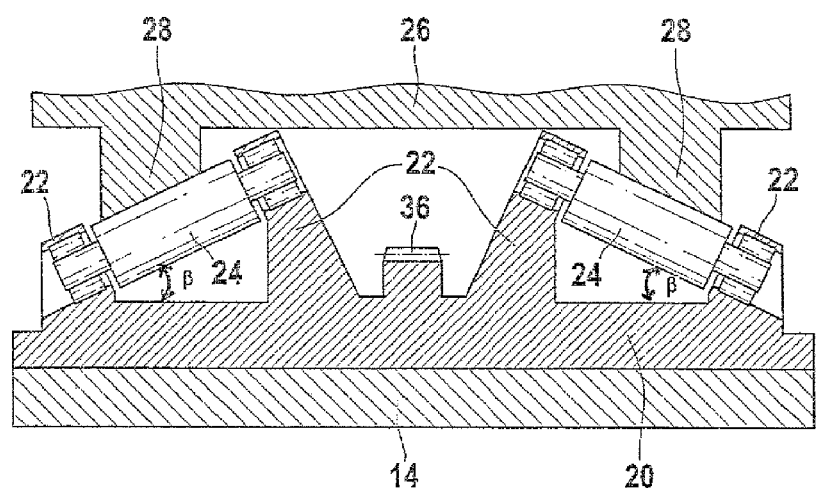
FIG. 3 is a sectional depiction in accordance with a line III in FIG. 2, which line has two bends in it.

As is clear from FIG. 3, the ramps 28 and the roller elements 24 are transversely inclined. The two ramps 28 situated further to the inside radially are inclined in the opposite direction from the ramp 28 situated further to the outside radially. Due to the opposing transverse inclination ($\beta$), the ramps 28 guide the friction brake pad 14 transversely in relation to the movement direction, i.e. radially in relation to the brake disc 16. Ideally, imaginary normals extending through the longitudinal centers of the ramps 28 intersect with an imaginary circular arc line whose radius in relation to the rotation axis of the brake disc 16 corresponds to the effective friction radius of the friction brake pad 14, at the level of the surface of the brake disc 16 associated with the friction brake pad 14.

The foregoing relates to the preferred exemplary embodiment of the invention, it being understood that other variants and embodiments thereof are possible within the spirit and scope of the invention, the latter being defined by the appended claims.

The invention claimed is:

1. A self-amplifying electromechanical partial lining disc brake, comprising:
    a friction brake pad (14);
    a brake disc (16);
    an electromechanical actuating device (36, 38), which presses the friction brake pad (14) against the brake disc (16) to actuate the partial lining disc brake (10); and
a self-amplification device equipped with a ramp mechanism (24, 28), the ramp mechanism (24, 28) supporting the friction brake pad (14) in a movable fashion in a circumferential direction and at a ramp angle in relation to the brake disc (16), the self-amplification device converting a friction force exerted by the rotating brake disc (16) on the friction brake pad (14) pressed against the brake disc (16) during braking into a pressing force that presses the friction brake pad (14) against the brake disc (16) in addition to a pressing force exerted by the actuating device (36, 38), the ramp mechanism having three ramps (28) along which roller elements (24) roll and which support the friction brake pad (14), the roller elements (24) being situated at the corners of an imaginary triangle (34), wherein the actuating device (36, 38) exerts a force on the friction brake pad (14) at an angle to the brake disc (16) along a line of action that passes through the imaginary triangle between and apart from the roller elements (24), wherein the ramps (28) have a transverse inclination, and the transverse inclination of a ramp (28) that is spaced a smaller distance apart from the rotation axis of the brake disc (16) is inclined in the opposite direction from the transverse inclination of a ramp (28) that is spaced a larger distance apart from the rotation axis of the brake disc (16).

2. The partial lining disc brake according to claim 1, wherein the line of action of the actuating force, which the actuating device (36, 38) exerts on the friction brake pad (14), passes through a centroid of the imaginary triangle (34).

3. The partial lining disc brake according to claim 1, wherein an intersection point of the line of action of the actuating force, which the actuating device (36, 38) exerts on the friction brake pad (14), with the imaginary triangle (34) is spaced the same distance apart from a rotation axis of the brake disc (16) as an effective friction radius of the friction brake pad (14).

4. The partial lining disc brake according to claim 1, wherein the line of action of the actuating force, which the actuating device (36, 38) exerts on the friction brake pad (14), extends in the movement direction of the friction brake pad (14).

5. The partial lining disc brake according to claim 1, wherein the partial lining disc brake (10) has a retaining spring (40), which acts on the friction brake pad (14) in the direction of the ramp mechanism (24, 28), and a line of action of the retaining spring (40) passes through the imaginary triangle.

6. The partial lining disc brake according to claim 5, wherein the line of action of the retaining spring (40) is spaced the same distance apart from a rotation axis of the brake disc (16) as the effective friction radius of the friction brake pad (14).

7. The partial lining disc brake according to claim 1, wherein the actuating device has a rack (36) and has a pinion (38), which meshes with the rack (36), and the rack (36) extends in a movement direction of the friction brake pad (14).

8. The partial lining disc brake according to claim 1, wherein the ramp mechanism (24, 28) has roller elements (24) that are supported at fixed positions and in a rotary fashion, which roll along the ramps (28).

9. A self-amplifying electromechanical partial lining disc brake, comprising:
 a friction brake pad;
 a brake disc;
 an electromechanical actuating device, which presses the friction brake pad against the brake disc to actuate the partial lining disc brake; and
 a self-amplification device equipped with a ramp mechanism supporting the friction brake pad in a movable fashion in a circumferential direction and at a ramp angle in relation to the brake disc, the self-amplification device converting a friction force exerted by the rotating brake disc on the friction brake pad pressed against the brake disc during braking into a pressing force that presses the friction brake pad against the brake disc in addition to a pressing force exerted by the actuating device, the ramp mechanism having three or more ramps along which roller elements roll and which support the friction brake pad, the roller elements being situated at the vertices of an imaginary shape defined between the ramps, wherein the actuating device exerts an actuating force on the friction brake pad along a line of action that originates within and passes through the imaginary shape between and apart from the roller elements.

10. The partial lining disc brake according to claim 9, wherein the line of action of the actuating force, which the actuating device exerts on the friction brake pad, passes through a centroid of the imaginary shape.

11. The partial lining disc brake according to claim 9, wherein an intersection point of the line of action of the actuating force, which the actuating device exerts on the friction brake pad, with the imaginary shape is spaced the same distance apart from a rotation axis of the brake disc as an effective friction radius of the friction brake pad.

12. The partial lining disc brake according to claim 9, wherein the partial lining disc brake has a retaining spring, which acts on the friction brake pad in the direction of the ramp mechanism, and a line of action of the retaining spring passes through the imaginary shape.

13. A self-amplifying electromechanical partial lining disc brake, comprising:
 a friction brake pad (14);
 a brake disc (16);
 an electromechanical actuating device (36, 38), which presses the friction brake pad (14) against the brake disc (16) to actuate the partial lining disc brake (10); and
a self-amplification device equipped with a ramp mechanism (24, 28), the ramp mechanism (24, 28) supporting the friction brake pad (14) in a movable fashion in a circumferential direction and at a ramp angle in relation to the brake disc (16), the self-amplification device converting a friction force exerted by the rotating brake disc (16) on the friction brake pad (14) pressed against the brake disc (16) during braking into a pressing force that presses the friction brake pad (14) against the brake disc (16) in addition to a pressing force exerted by the actuating device (36, 38), the ramp mechanism having three ramps (28) along which roller elements (24) roll and which support the friction brake pad (14), the roller elements (24) being situated at the corners of an imaginary triangle (34), wherein the actuating device (36, 38) exerts at least one force on the friction brake pad (14) at an angle to the brake disc (16) along a line of action, in which the line of action of each of said at least one force passes through the imaginary triangle between and apart from the roller elements (24), wherein the ramps (28) have a transverse inclination, and the transverse inclination of a ramp (28) that is spaced a smaller distance apart from the rotation axis of the brake disc (16) is inclined in the opposite direction from the transverse inclination of a ramp (28) that is spaced a larger distance apart from the rotation axis of the brake disc (16).

14. A self-amplifying electromechanical partial lining disc brake, comprising:
 a friction brake pad;
 a brake disc;
 an electromechanical actuating device, which presses the friction brake pad against the brake disc to actuate the partial lining disc brake; and
 a self-amplification device equipped with a ramp mechanism supporting the friction brake pad in a movable fashion in a circumferential direction and at a ramp angle in relation to the brake disc, the self-amplification device converting a friction force exerted by the rotating brake disc on the friction brake pad pressed against the brake disc during braking into a pressing force that presses the friction brake pad against the brake disc in addition to a pressing force exerted by the actuating device, the ramp mechanism having three or more ramps along which roller elements roll and which support the friction brake pad, the roller elements being situated at the vertices of an imaginary shape defined between the ramps, wherein the actuating device exerts at least one actuating force on the friction brake pad along a line of action, in which the line of action of each of said at least one actuating force originates within and passes through the imaginary shape between and apart from the roller elements.

* * * * *